United States Patent

Aley

[15] 3,662,191

[45] May 9, 1972

[54] MEMORY DRIVE CIRCUIT

[72] Inventor: Albert H. Aley, Holliston, Mass.

[73] Assignee: GTE Sylvania Incorporated

[22] Filed: Jan. 20, 1971

[21] Appl. No.: 108,090

[52] U.S. Cl. ............................307/270, 307/215, 307/242, 328/60

[51] Int. Cl. ............................H03k 3/02

[58] Field of Search ..................307/240, 241, 242, 243, 215, 307/236, 254, 270; 328/60, 61, 116, 117, 118, 154; 340/173 FF

[56] References Cited

UNITED STATES PATENTS

| | | | |
|---|---|---|---|
| 3,519,851 | 7/1970 | Groner | 307/270 X |
| 3,466,462 | 9/1969 | Hounsome | 307/240 |
| 3,229,119 | 1/1966 | Bohn et al | 307/215 X |
| 3,470,391 | 9/1969 | Granger | 307/270 |
| 3,522,444 | 8/1970 | Lourie | 307/215 X |
| 3,560,761 | 2/1971 | Kardash | 307/215 |

OTHER PUBLICATIONS

Trinko, " Modular Current Driver," IBM Technical Disclosure Bulletin, Vol. 9, No. 10, P. 1428, 3/1967.
Cielo, " Current Drive Circuit," IBM Technical Disclosure Bulletin, Vol. 9, No. 7, p. 932, 12/1966.
" Integrated Circuits," Sylvania Universal High Level Logic, pgs. 4– 13

*Primary Examiner*—Donald D. Forrer
*Assistant Examiner*—L. N. Anagnos
*Attorney*—Norman J. O'Malley, Elmer J. Nealon and David M. Keay

[57] ABSTRACT

Floating switch type of memory drive circuit having a transformer with the ends of the secondary winding connected to the base and emitter of a driving transistor. TTL NAND logic gates of the type having a pull-up transistor are connected to each end of the primary winding. When one of the gates is operated to produce a logic O at its output and the other gate is operated to produce a logic 1 at its output, the driving transistor turns on rapidly. When the operating states of the gates are subsequently reversed, the driving transistor turns off rapidly.

6 Claims, 3 Drawing Figures

| A | B | C | D | E | F | G | H | I | J | K | $QD_1$ | $QD_2$ | $QD_3$ | $QD_4$ |
|---|---|---|---|---|---|---|---|---|---|---|---|---|---|---|
| 0 | 0 | 1 | 1 | 0 | 1 | 1 | 1 | 1 | 1 | 1 | ON | off | off | off |
| 0 | 0 | 0 | 0 | 1 | 1 | 1 | 1 | 1 | 1 | 1 | OFF | off | off | off |
| 0 | 1 | 1 | 1 | 1 | 1 | 0 | 1 | 1 | 1 | 1 | off | ON | off | off |
| 0 | 1 | 0 | 1 | 1 | 0 | 1 | 1 | 1 | 1 | 1 | off | OFF | off | off |
| 1 | 0 | 1 | 1 | 1 | 1 | 1 | 1 | 0 | 1 | 1 | off | off | ON | off |
| 1 | 0 | 0 | 1 | 1 | 1 | 1 | 0 | 1 | 1 | 1 | off | off | OFF | off |
| 1 | 1 | 1 | 1 | 1 | 1 | 1 | 1 | 1 | 1 | 0 | off | off | off | ON |
| 1 | 1 | 0 | 1 | 1 | 1 | 1 | 1 | 1 | 0 | 1 | off | off | off | OFF |

ON = FORWARD BIASING CURRENT FLOWS THROUGH TRANSFORMER
OFF = REVERSE BIASING CURRENT FLOWS THROUGH TRANSFORMER
off = NO CURRENT FLOWS THROUGH TRANSFORMER

| A | B | C | D | E | F | G | H | I | J | K | $QD_1$ | $QD_2$ | $QD_3$ | $QD_4$ |
|---|---|---|---|---|---|---|---|---|---|---|---|---|---|---|
| 0 | 0 | 1 | 1 | 0 | 1 | 1 | 1 | 1 | 1 | 1 | ON | off | off | off |
| 0 | 0 | 0 | 0 | 1 | 1 | 1 | 1 | 1 | 1 | 1 | OFF | off | off | off |
| 0 | 1 | 1 | 1 | 1 | 1 | 0 | 1 | 1 | 1 | 1 | off | ON | off | off |
| 0 | 1 | 0 | 1 | 1 | 0 | 1 | 1 | 1 | 1 | 1 | off | OFF | off | off |
| 1 | 0 | 1 | 1 | 1 | 1 | 1 | 1 | 0 | 1 | 1 | off | off | ON | off |
| 1 | 0 | 0 | 1 | 1 | 1 | 1 | 0 | 1 | 1 | 1 | off | off | OFF | off |
| 1 | 1 | 1 | 1 | 1 | 1 | 1 | 1 | 1 | 1 | 0 | off | off | off | ON |
| 1 | 1 | 0 | 1 | 1 | 1 | 1 | 1 | 1 | 0 | 1 | off | off | off | OFF |

ON = FORWARD BIASING CURRENT FLOWS THROUGH TRANSFORMER
OFF = REVERSE BIASING CURRENT FLOWS THROUGH TRANSFORMER
off = NO CURRENT FLOWS THROUGH TRANSFORMER INVENTOR.
ALBERT H. ASHLEY
BY David M. Keay
AGENT INVENTOR.
ALBERT H. ASHLEY
BY
David M. Keay
AGENT

MEMORY DRIVE CIRCUIT

BACKGROUND OF THE INVENTION

This invention relates to drive circuits. More particularly, it is concerned with circuits for rapidly turning on and turning off the driving transistors of a memory drive line selection matrix.

Many memory systems employ the so-called "floating switch" type of memory drive circuit in which a transformer is employed to provide D.C. isolation between the driving transistor and the input address logic. The input address logic is connected to the primary winding of the transformer and the secondary winding of the transformer is connected across the input to the driving transistor. The input address logic, which is typically of the transistor-transistor-logic (TTL) type, provides sufficient drive current through the primary winding of the transformer to cause the driving transistor to be switched rapidly to saturation. However, when the input logic terminates current flow through the primary winding, only the stored energy in the secondary winding is available to turn the saturated driving transistor off. Thus, the driving transistor turn-off time is relatively slow compared to the turn-on time.

Improvements in turn-off time can be obtained by employing pulse transformers specially designed for the particular input pulse conditions of the system. Another technique is the addition of inductors of suitable value across the secondary winding and transistor biasing resistance. However, these techniques are expensive and do not provide sufficient control of turn-off characteristics to obtain close agreement between the input and the output pulse widths.

SUMMARY OF THE INVENTION

Rapid turn-off and turn-on of driving transistors is provided by drive circuits of the floating switch type in accordance with the present invention. A drive circuit according to the invention includes a transformer having a primary winding and a secondary winding. A first circuit means in the drive circuit includes a first pair of transistors with the collector of one transistor and the emitter of the other transistor connected to one end of the primary winding. A first input means is connected to the transistors of the first pair and operates to bias the one transistor in the conducting condition and the other transistor in the non-conducting condition during the occurrence of a first input condition at its input connection and operates to bias the one transistor in the non-conducting condition and the other transistor in the conducting condition during the occurrence of a second input condition at its input connection.

The drive circuit also includes a second circuit means which is similar to the first circuit means and includes a second pair of transistors with the collector of one transistor and the emitter of the other transistor connected to the other end of the primary winding of the transformer. A second input means is connected to the transistors of the second pair and operates to bias the one transistor in the conducting condition and the other transistor in the non-conducting condition during the occurrence of a first input condition at its input connection and operates to bias the one transistor in the non-conducting condition and the other transistor in the conducting condition during the occurrence of a second input condition at its input connection.

Input data means is connected to the first and second circuit means and operates to produce the first input condition at the input connection to the first input means and the second input condition at the input connection to the second input means in response to one set of input data being applied to it. The input data means operates to produce the first input condition at the input connection to the second input means and the second input condition at the input connection to the first input means in response to another set of input data being applied to it.

The drive circuit also includes a driving transistor circuit means including a driving transistor having its emitter connected to one end of the secondary winding of the transformer and its base connected to the other end of the secondary winding of the transformer. The driving transistor circuit means operates to cause the driving transistor to conduct when a biasing voltage is present across the secondary winding of the transformer.

Thus, when the first input condition is applied at the input connection to the first input means and the second input condition is applied at the input connection to the second input means by the input data means, the one transistor of the first pair of transistors and the other transistor of the second pair of transistors conduct and current flows in one direction through the primary winding of the transformer inducing a forward biasing voltage across the secondary winding thereby causing the driving transistor to conduct. Subsequently when the first input condition is applied at the input connection to the second input means and the second input condition is applied at the input connection to the first input means by the input data means, the one transistor of the second pair of transistors and the other transistor of the first pair of transistors conduct and current flows in the opposite direction through the primary winding of the transformer inducing a reverse biasing voltage across the secondary winding thereby rapidly switching the driving transistor to non-conduction.

BRIEF DESCRIPTION OF THE DRAWINGS

Additional objects, features, and advantages of drive circuits in accordance with the present invention will be apparent from the following detailed discussion together with the accompanying drawings wherein.

DETAILED DESCRIPTION OF THE INVENTION

Figures 1, 3:
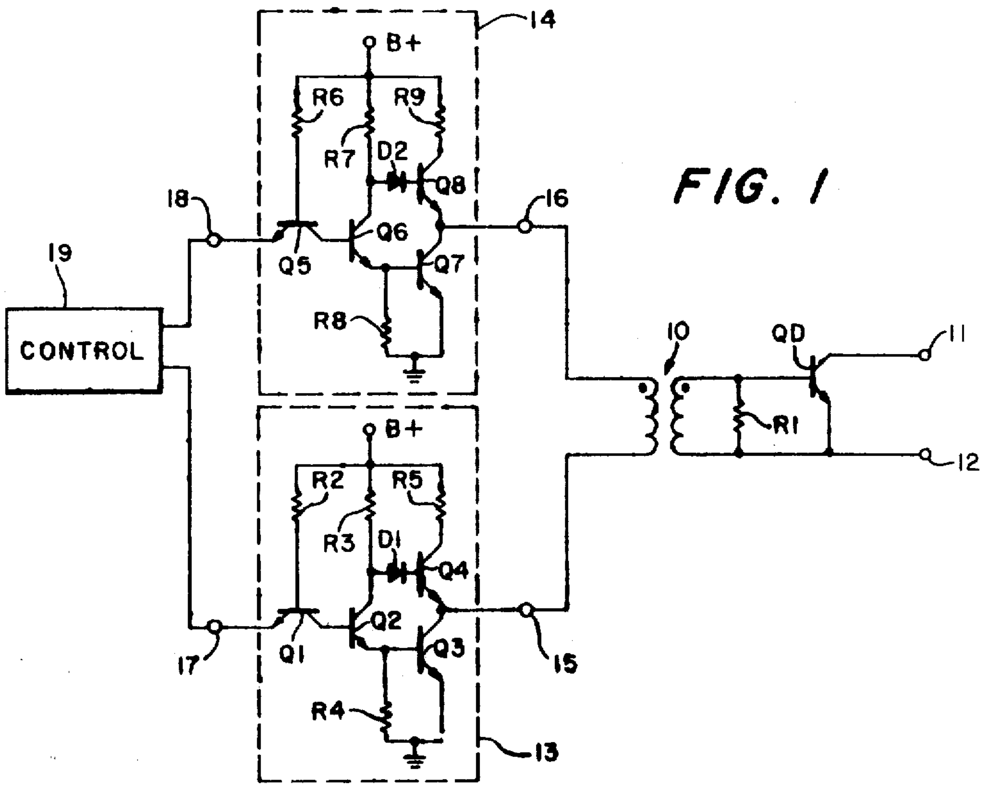
FIG. 1 is a schematic circuit diagram illustrating a drive circuit in accordance with the present invention.
FIG. 3 is a truth table indicating the operating possibilities of the apparatus of FIG. 2.

The drive circuit in accordance with the present invention illustrated in the schematic circuit diagram of FIG. 1 includes an NPN driving transistor QD having its emitter and base connected to opposite ends of the secondary winding of a transformer 10. A biasing resistor R1 is connected between the base and emitter of the driving transistor QD. The collector and emitter are connected to terminals 11 and 12 which serve as the output terminals of the switch.

The two ends of the primary winding of the transformer 10 are connected to the output connections 15 and 16 of two similar circuits 13 and 14. These circuits may be typical TTL NAND logic gates of well-known type. The first circuit 13 includes a pair of NPN transistors Q3 and Q4. The collector of one transistor Q3 and the emitter of the other transistor Q4 are connected directly to the output terminal 15. The emitter of the one transistor Q3 is connected directly to ground and the collector of the other transistor Q4 is connected through a resistance R5 to a positive source of voltage B+.

The two transistors Q3 and Q4 of the pair are biased in conducting and non-conducting conditions by a biasing arrangement including an NPN coupling transistor Q2 having its emitter connected directly to the base of transistor Q3 and through a resistance R4 to ground and having its collector connected through a diode D1 to the base of transistor Q4 and through a resistance R3 to the B+ voltage source. When coupling transistor Q2 is conducting, transistor Q3 is biased to conduction and transistor Q4 is biased in the non-conducting condition. When transistor Q2 is in the non-conducting condition, transistor Q3 is also biased in the non-conducting condition and transistor Q4 is biased in the conducting condition. The first circuit 13 also includes an NPN input transistor Q1 having its emitter connected to an input terminal 17, its collector connected directly to the base of the coupling transistor Q2, and its base connected through a resistance R2 to the B+ voltage source.

The first circuit 13 is a typical TTL NAND gate which in response to a relatively high input voltage at its input terminal 17 (designated a "1" logic level) biases the coupling transistor Q2 to conduction thus causing transistor Q3 to be biased in the conducting condition and transistor Q4 to be biased in the non-conducting condition. When a relatively low voltage is applied to the input terminal 17 (designated a "0" logic level) the base-emitter junction of transistor Q1 is forward biased and the voltage at its collector is such as to bias the coupling transistor Q2 to non-conduction. Under this condition transistor Q3 is biased in the non-conducting condition and the base of transistor Q4 is biased for conduction, depending upon conditions present at the output terminal 15.

The second circuit 14 is similar to the first circuit 13, having a second pair of NPN transistors Q7 and Q8 with the collector of one transistor Q7 and the emitter of the other transistor Q8 connected to the output terminal 16. A biasing arrangement of an NPN coupling transistor Q6, resistance R7, and resistance R8 establishes the biasing conditions at the bases of transistors Q7 and Q8. An NPN input transistor Q5 has its emitter connected to the input terminal 18. The coupling transistor Q6 is biased into conduction or non-conduction depending upon the input signal voltage applied at the input terminal 18.

For illustrative purposes, the input terminals 17 and 18 of the first and second circuits 13 and 14, respectively, are shown connected to the output connections of a control circuit 19. The drive circuit of FIG. 1 operates in response to output signals from the control circuit 19 in the following manner.

When the control circuit 19 produces a relatively low voltage level (logic 0) on both terminals 17 and 18, the first and second circuits 13 and 14 operate to bias both transistors Q3 and Q7 in the non-conducting condition, and both transistors Q4 and Q8 in the conducting condition. Thus, no potential difference occurs across the output terminals 15 and 16, or across the primary winding of the transformer 10. No current flows through the primary or secondary windings of the transformer 10 and the drive transistor QD does not conduct.

When the control circuit 19 produces a relatively high voltage level (logic 1) on both input terminals 17 and 18 of the first and second circuits 13 and 14, both transistors Q3 and Q7 are biased in the conducting condition and both transistors Q4 and Q8 are biased in the non-conducting condition. Thus, no potential difference occurs across the primary winding of the transformer 10 and drive transistor QD does not conduct.

When the control circuit 19 switches from a previous operating state to produce a relatively high voltage level (logic 1) at the input terminal 17 of the first circuit 13 and simultaneously a relatively low voltage level (logic 0) at the input terminal 18 of the second circuit 14, one or both of the two circuits 13 and 14 switches very rapidly to bias the one transistor Q3 of the first pair of transistors and the other transistor Q8 of the second pair of transistors to conduction. Current flows from the B+ voltage source of the second circuit 14 through transistor Q8, the primary winding of the transformer 10, and transistor Q3 to ground. The flow of current through the primary winding induces a potential across the secondary winding which is in phase with the current flow in the primary winding. This potential across the biasing resistance R1 forward biases the base-emitter junction of the driving transistor QD causing that transistor to conduct and to provide a low impedance between its output terminals 11 and 12.

When the control circuit 19 subsequently reverses the conditions at the input terminals 17 and 18 producing the high voltage level (logic 1) at the input terminal 18 of the second circuit 14 and the low voltage level (logic 0) at the input terminal 17 of the first circuit 13, the one transistor Q7 of the second pair of transistors and the other transistor Q4 of the first pair of transistors conduct. Current thus flows in the reverse direction from the B+ voltage source of the first circuit 13 through transistor Q4, the primary winding of the transformer 10, and transistor Q7 to ground. A voltage in phase with the current through the primary winding is induced across the secondary winding.

The induced voltage reverse biases the base-emitter junction of the driving transistor QD, and the charge stored in the transistor QD while it was operating in saturation is rapidly removed. The driving transistor QD is thus very quickly switched to non-conduction and a high impedance condition is established across the output terminals 11 and 12.

Figure 2:
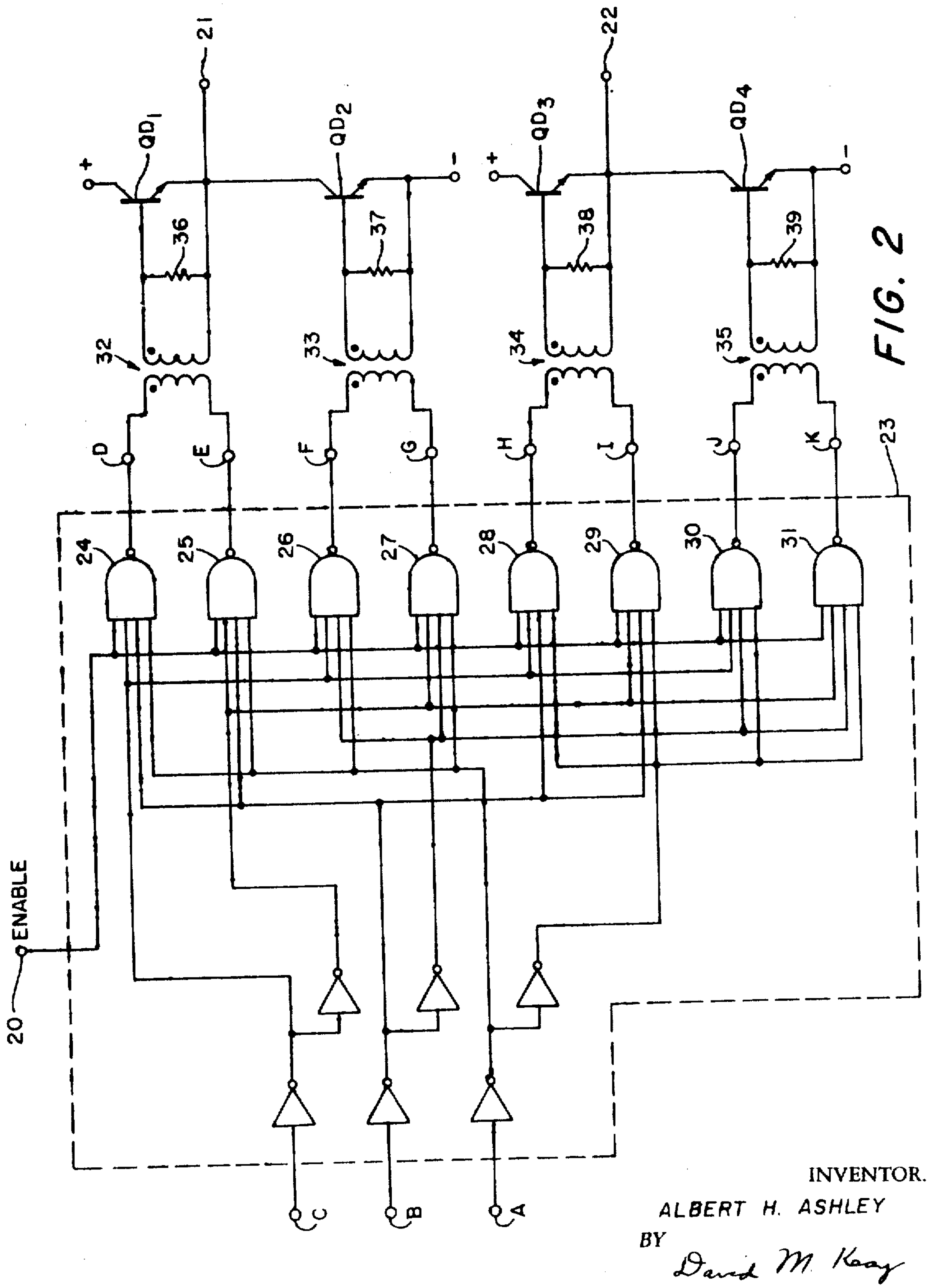
FIG. 2 is a diagram illustrating several drive circuits of the type shown in FIG. 1 together with an exemplary input address logic arrangement.

FIG. 2 is a diagram illustrating apparatus employing four drive circuits in accordance with the invention as shown in FIG. 1 for producing bipolar output pulses at two output terminals 21 and 22 as determined by the address input data received at two address input data terminals A and B. The input data at a third input data terminal C controls the turnoff of the output pulses.

The data input terminals A, B, and C and an enable terminal 20 are connected to a binary to 1-of-8 decoder 23. Relatively high voltage level signals (logic 1) or relatively low voltage level signals (logic 0) are applied to the input terminals A, B, and C. Depending upon the particular input signals at the three input terminals A. B, and C, during the presence of a relatively high voltage level (logic 1) at the enable terminal 20, a relatively low voltage level condition (logic 0) is produced at one of the decoder output terminals D through K while a relatively high voltage level condition (logic 1) is produced at the remaining seven of the decoder output terminals. Each of the gates 24 through 31 of the decoder is a TTL NAND gate similar to circuits 13 and 14 of FIG. 1. Each pair of gates 25 and 24, 27 and 26, 29 and 28, and 31 and 30 corresponds to the first and second circuits 13 and 14 of the drive circuit illustrated in FIG. 1. The primary winding of a transformer 32, 33, 34, and 35, respectively, is connected between the output terminals of each pair of gates.

The secondary windings of each of the transformers 32, 33, 34, and 35 is connected between the base and emitter of NPN driving transistors $QD_1$, $QD_2$, $QD_3$, and $QD_4$, respectively. Biasing resistances 36, 37, 38, and 39, respectively, are connected across the secondary windings. The collector of driving transistor $QD_1$ is connected to a positive source of voltage, and its emitter is connected to the first output terminal 21 and to the collector of driving transistor $DQD_2$. The emitter of driving transistor $QD_2$ is connected to a negative source of voltage. The collector of driving transistor $QD_3$ is also connected to a positive source of voltage, and its emitter is connected to the second output terminal 22 and to the collector of driving transistor $QD_4$. The emitter of driving transistor $QD_4$ is connected to a negative source of voltage.

Operation of the apparatus of FIG. 2 may best be understood with reference to the truth table of FIG. 3. Data in the form of relatively low voltage level signals (logic 0) or relatively high voltage level signals (logic 1) are applied at the input terminals A, B, and C and also at the enable terminal 20 to control operation of the four driving transistors $QD_1$, $QD_2$, $QD_3$, and $QD_4$. Data at input terminals A and B determine which one of the four transformers 32, 33, 34 or 35 and associated driving transistor $QD_1$, $QD_2$, $QD_3$, $QD_4$ is being addressed. Data at the third input terminal C controls the direction of current flow through the primary winding of the transformer addressed by the input data at terminals A and B.

For example, a high level input signal (logic 1) at the A input terminal and a low level input signal (logic 0) at the B input terminal addresses the third transformer 34 and its associated driving transistor $QD_3$ through decoder terminals H and I. With the high level signal (logic 1) at the C input terminal and also at the enable terminal 20, the decoder terminals H and I have a high level (logic 1) and low level (logic O) voltage condition, respectively. Thus, current is caused to flow through the primary winding of the third transformer 34 in a direction to induce a biasing potential across the secondary winding. The third driving transistor $QD_3$ conducts producing a positive-going pulse at the second output terminal 22.

When the input signal at the input data terminal C changes to a low level (logic 0), the operating conditions of the two NAND gates 28 and 29 are reversed and the output voltages at decoder terminals H and I become low (logic 0) and high (logic 1), respectively. Current is caused to flow in the reverse direction through the primary winding of the transformer 34. This action causes a reverse current flow through the secondary winding of the transformer 34 rapidly discharging the stored charge in the previously saturated driving transistor $QD_3$ and terminating the positive-going pulse at the second output terminal 22.

In a similar manner if the input signals at the input data terminals A and B are both at the high level (logic 1) and a high level signal (logic 1) is present at the third input data terminal C and also at the enable terminal 20, a high level voltage condition (logic 1) is produced at decoder terminal J and a low level voltage condition (logic 0) is produced at the decoder terminal K. Thus, current is caused to flow through the primary winding of the fourth transformer 35 inducing a biasing voltage across the secondary winding and causing the fourth driving transistor $QD_4$ to conduct. A negative-going pulse is produced at the second output terminal 22.

When the input signal at the third input terminal C is changed to the low level (logic 0), the operating conditions of the NAND gates 30 and 31 are reversed and the output voltages at the decoder terminals J and K change to the low level (logic 0) and high level (logic 1), respectively. This action causes current flow through the primary winding of the transformer 35 to be reversed. A reverse biasing voltage is induced across the secondary winding of the transformer rapidly discharging the stored charge in driving transistor $QD_4$ and causing that transistor to become non-conducting. The negative-going pulse at the second output terminal 22 is thereby terminated.

Thus, the drive circuit as shown in FIG. 1 may be employed in apparatus such as that shown in FIG. 2 for providing driving pulses of either polarity. The two pairs of transistors connected to the opposite ends of the primary winding of the transformer and operating in alternation provide for rapid turn-on and rapid turn-off of the driving transistor. Propagation delays through the circuit are approximately the same for turn-on and turn-off and thus the output pulse widths are in close agreement with the input pulse widths.

The apparatus may employ the individual circuits of Sylvania SUHL I SG–140 series quad 2-input NAND/NOR gates as the TTL NAND gates. Each transformer may be a PE7709 pulse transformer produced by Pulse Engineering, Inc. The driving transistors may be 2N5262 NPN transistors. In the apparatus of FIG. 2 the decoder 23 may be a Sylvania SM–233 or Motorola MC 4006 binary to 1-of-8 decoder.

While there has been shown and described what is considered a preferred embodiment of the present invention, it will be obvious to those skilled in the art that various changes and modifications may be made therein without departing from the invention as defined in the appended claims.

What is claimed is:

1. A drive circuit including in combination
   a transformer having a primary winding and a secondary winding;
   a first circuit means including
      a first pair of transistors having the collector of one transistor and the emitter of the other transistor connected to one end of the primary winding,
      a first input means connected to the transistors of the first pair of transistors and operable to bias the one transistor in the conducting condition and the other transistor in the non-conducting condition during the occurrence of a first input condition at the input connection thereto, and operable to bias the one transistor in the non-conducting condition and the other transistor in the conducting condition during the occurrence of a second input condition at the input connection thereto;
   a second circuit means including
      a second pair of transistors having the collector of one transistor and the emitter of the other transistor connected to the other end of the primary winding,
      a second input means connected to the transistors of the second pair of transistors and operable to bias the one transistor in the conducting condition and the other transistor in the non-conducting condition during the occurrence of a first input condition at the input connection thereto, and operable to bias the one transistor in the non-conducting condition and the other transistor in the conducting condition during the occurrence of a second input condition at the input connection thereto;
   input data means connected to said first and second circuit means and operable to produce the first input condition at the input connection to the first input means and the second input condition at the input connection to the second input means in response to one set of input data being applied thereto, and operable to produce the first input condition at the input connection to the second input means and the second input condition at the input connection to the first input means in response to another set of input data being applied thereto;
   driving transistor circuit means including a driving transistor having its emitter connected to one end of the secondary winding of the transformer and its base connected to the other end of the secondary winding of the transformer, said driving transistor circuit means being operable to cause the driving transistor to conduct when a biasing voltage is present across the secondary winding of the transformer;
   whereby when the first input condition is applied at the input connection to the first input means and the second input condition is applied at the input connection to the second input means by the input data means, the one transistor of the first pair of transistors and the other transistor of the second pair of transistors conduct and current flows in one direction through the primary winding of the transformer inducing a forward biasing voltage across the secondary winding thereby causing the driving transistor to conduct; and subsequently when the first input condition is applied at the input connection to the second input means and the second input condition is applied at the input connection to the first input means by the input data means, the one transistor of the second pair of transistors and the other transistor of the first pair of transistors conduct and current flows in the opposite direction through the primary winding of the transformer inducing a reverse biasing voltage across the secondary winding thereby rapidly switching the driving transistor to non-conduction.

2. A drive circuit in accordance with claim 1 wherein
   said first input means includes a first coupling transistor having its emitter connected to the base of the one transistor of the first pair of transistors and its collector connected to the base of the other transistor of the first pair and operable when in a conducting condition to bias the one transistor in the conducting condition and the other transistor in the non-conducting condition and operable when in a non-conducting condition to bias the one transistor in the non-conducting condition and the other transistor in the conducting condition, said first coupling transistor being biased to conduction during the occurrence of the first input condition at the input connection to the first input means and being biased to non-conduction during the occurrence of the second input condition at the input connection to the first input means; and
   said second input means includes a second coupling transistor having its emitter connected to the base of the one transistor of the second pair of transistors and its collector connected to the base of the other transistor of the second pair and operable when in a conducting condition to bias the one transistor in the conducting condition and the other transistor in the non-conducting condition and operable when in a non-conducting condition to bias the one transistor in the non-conducting condition and the other transistor in the conducting condition, said second coupling transistor being biased to conduction during the occurrence of the first input condition at the input connection to the second input means and being biased to non-conduction during the occurrence of the second input condition at the input connection to the second input means.

3. A drive circuit in accordance with claim 2 wherein said first input means includes a first input transistor having its emitter connected to a first input terminal, its collector connected to the base of the first coupling transistor, and its base connected through a resistance to a first source of reference potential;

the collector of the first coupling transistor and the collector of the other transistor of the first pair of transistors are connected to the first source of reference potential;

the emitter of the one transistor of the first pair of transistors is connected to a second source of reference potential;

said second input means includes a second input transistor having its emitter connected to a second input terminal, its collector connected to the base of the second coupling transistor, and its base connected through a resistance to the first source of reference potential;

the collector of the second coupling transistor and the collector of the other transistor of the second pair of transistors are connected to the first source of reference potential; and the emitter of the one transistor of the second pair of transistors is connected to the second source of reference potential.

4. A drive circuit in accordance with claim 3 wherein all of said transistors are of the same conductivity type; and the one end and the other end of the secondary winding of the transformer are in phase with the one end and the other end, respectively, of the primary winding.

5. Apparatus including in combination a first drive circuit in accordance with claim 1;

a second drive circuit in accordance with claim 1;

the collector of the driving transistor of the first drive circuit being connected to a third source of reference potential;

the emitter of the driving transistor of the first drive circuit and the collector of the driving transistor of the second drive circuit being connected to an output terminal;

the emitter of the driving transistor of the second drive circuit being connected to a fourth source of reference potential;

whereby operation of the input data means of the first drive circuit to produce the first input condition at the input connection to the first input means and the second input condition at the input connection to the second input means of the first drive circuit and then to produce the first input condition at the input connection to the second input means and the second input condition at the input connection to the first input means of the first drive circuit produces a pulse of one polarity at the output terminal, and operation of the input data means of the second drive circuit to produce the first input condition at the input connection to the first input means and the second input condition at the input connection to the second input means of the second drive circuit and then to produce the first input condition at the input connection to the second input means and the second input condition at the input connection to the first input means of the second drive circuit produces a pulse of the opposite polarity at the output terminal.

6. Apparatus including in combination a first drive circuit in accordance with claim 3;

a second drive circuit in accordance with claim 3;

the collector of the driving transistor of the first drive circuit being connected to a third source of reference potential;

the emitter of the driving transistor of the first drive circuit and the collector of the driving transistor of the second drive circuit being connected to an output terminal;

the emitter of the driving transistor of the second drive circuit being connected to a fourth source of reference potential of opposite polarity from said third source;

the input data means of the first drive circuit and the input data means of the second drive circuit having common input data connections, the first input condition being produced at the input connection to the first input means and the second input condition being produced at the input connection to the second input means of the first drive circuit when a first set of input data is present at the common input data connections, the first input condition being produced at the input connection to the second input means and the second input condition being produced at the input connection to the first input means of the first drive circuit when a second set of input data is present at the common input data connections, the first input condition being produced at the input connection to the first input means and the second input condition being produced at the input connection to the second input means of the second drive circuit when a third set of input data is present at the common input data connections and the first input condition being produced at the input connection to the second input means and the second input condition being produced at the input connection to the first input means of the second drive circuit when a fourth set of input data is present at the common input data connections;

whereby the presence of the first set of input data at the common input data connections and then the presence of the second set of input data at the common input data connections produces a pulse of one polarity at the output terminal, and the presence of the third set of input data at the common input data connections and then the presence of the fourth set of input data at the common input data connections produces a pulse of the opposite polarity at the output terminal.

* * * * *

PO-1050
(5/69)

UNITED STATES PATENT OFFICE
CERTIFICATE OF CORRECTION

Patent No. 3,662,191 Dated May 9, 1972

Inventor(s) Albert H. Ashley

It is certified that error appears in the above-identified patent and that said Letters Patent are hereby corrected as shown below:

In the heading (Item [72] Inventor), the inventor should be --Albert H. Ashley--.

At column 4, line 44, "$DQD_2$" should be --$QD_2$--.

Signed and sealed this 5th day of December 1972.

(SEAL)
Attest:

EDWARD M.FLETCHER,JR.
Attesting Officer

ROBERT GOTTSCHALK
Commissioner of Patents